G. W. BINGHAM.
MOTION PICTURE APPARATUS.
APPLICATION FILED OCT. 23, 1918.
1,392,475.
Patented Oct. 4, 1921.
3 SHEETS—SHEET 2.
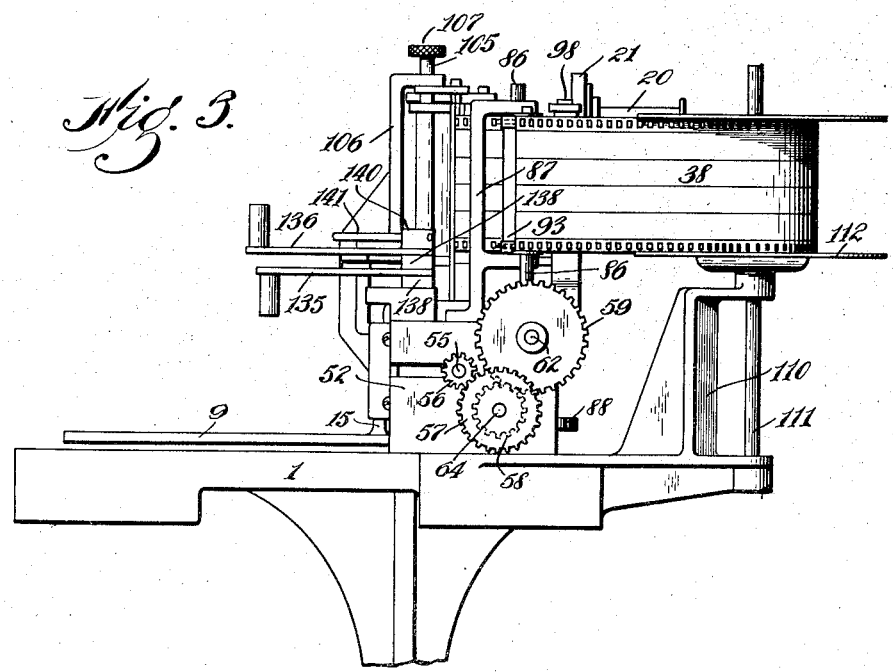
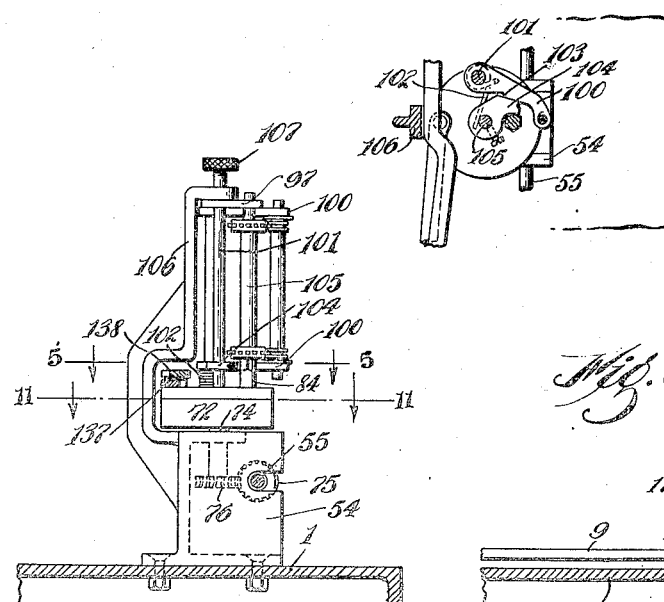
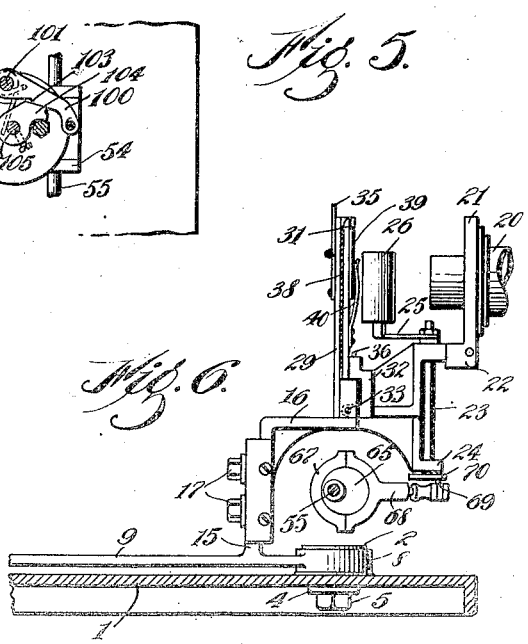

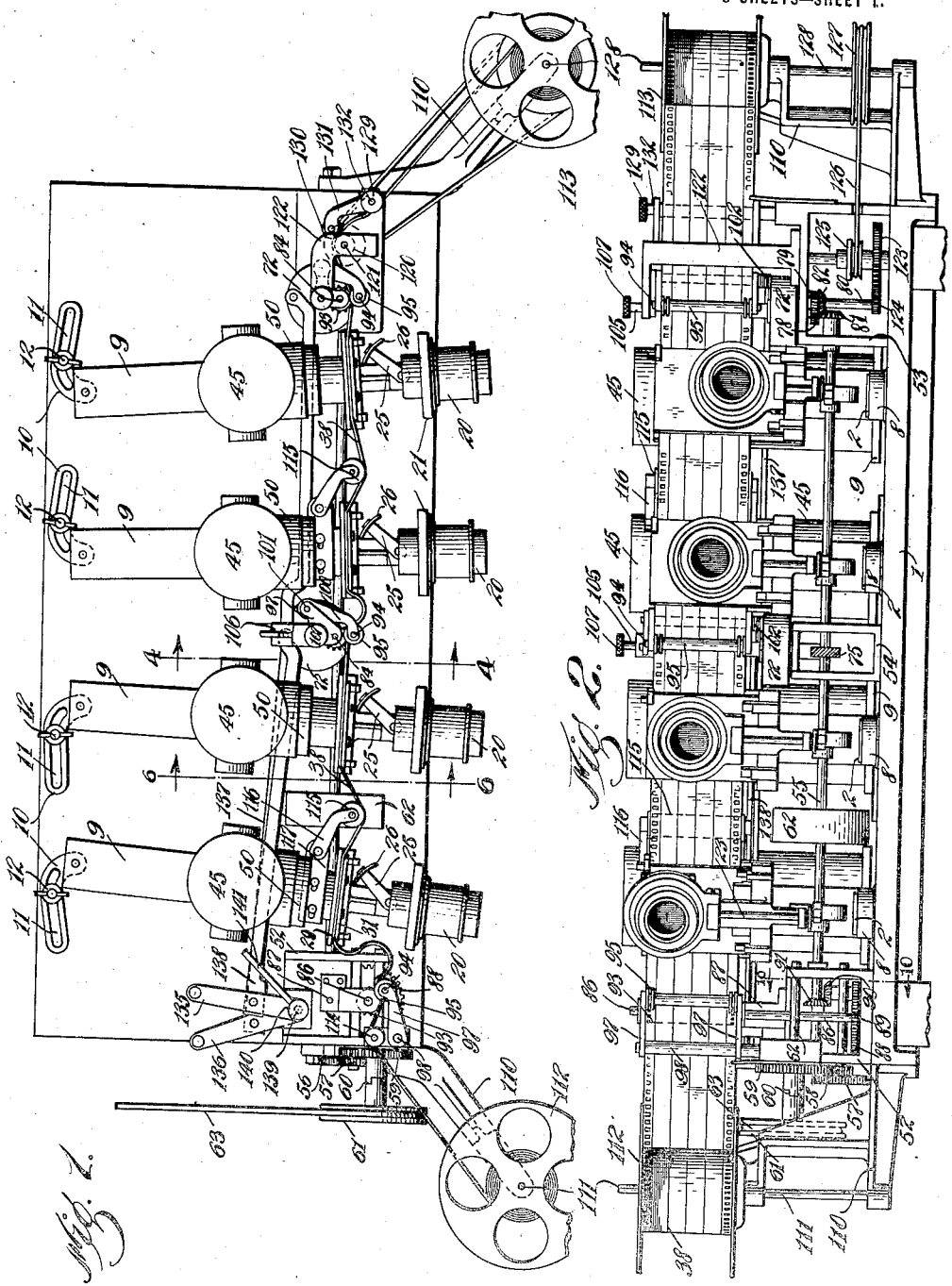

G. W. BINGHAM.
MOTION PICTURE APPARATUS.
APPLICATION FILED OCT. 23, 1918.
1,392,475.
Patented Oct. 4, 1921.
3 SHEETS—SHEET 3.
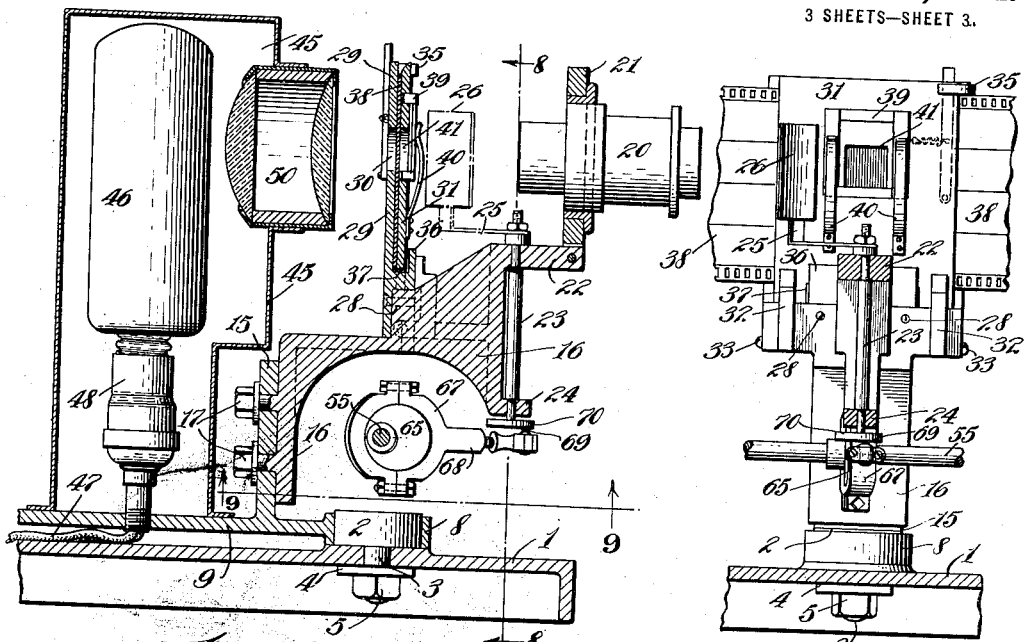
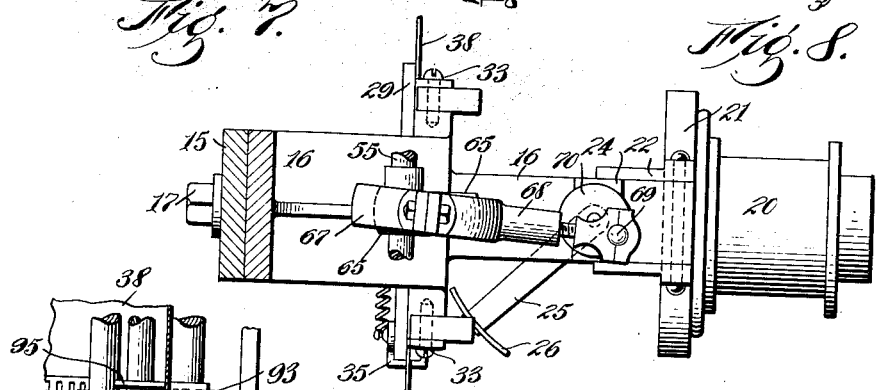
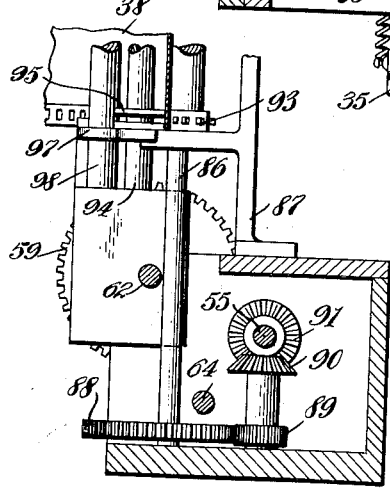
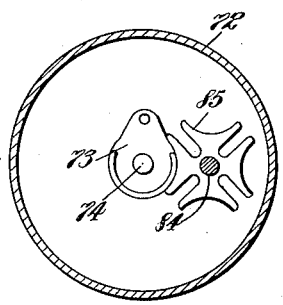
Inventor,
George W. Bingham.
By Hull, Smith, Brock & West
Attys.

UNITED STATES PATENT OFFICE.

GEORGE W. BINGHAM, OF CLEVELAND, OHIO, ASSIGNOR TO THE INTERNATIONAL MOVING PICTURE & FILM COMPANY, OF NASHVILLE, TENNESSEE, A CORPORATION OF TENNESSEE.

MOTION-PICTURE APPARATUS.

1,392,475.     Specification of Letters Patent.     Patented Oct. 4, 1921.

Application filed October 23, 1918. Serial No. 259,362.

*To all whom it may concern:*

Be it known that I, GEORGE W. BINGHAM, a citizen of the United States, residing at Cleveland, in the county of Cuyahoga and State of Ohio, have invented a certain new and useful Improvement in Motion-Picture Apparatus, of which the following is a full, clear, and exact description, reference being had to the accompanying drawings.

This invention relates to the art of motion pictures and has for its general purpose the production of apparatus capable of comprehending panoramic or cycloramic views of very wide angle.

To the attainment of this general result, the apparatus comprises a plurality of individual cinematographic mechanisms or units for handling the several sections or divisions of a composite view; and a further purpose is the provision of apparatus of this nature wherein the various units may be adjusted with respect to each other in the accomplishment of a perfect joinder of view sections so that no line of demarcation can be distinguished between them with the result that a well defined and smooth appearing composite view is obtained.

Certain features of the invention are applicable to both camera and projector and although illustrated herein as incorporated in a projector are not thus limited to such use.

Other objects of the invention are to produce a highly efficient apparatus of the aforesaid character through which distinctness and definition of image are obtained; that is very convenient of manipulation; is comparatively economical of operation; wherein the units for handling the several view sections are readily adjustable with respect to each other thereby to vary the size or scope of the picture; wherein the foregoing adjustment may be made without interfering with the film; wherein a film may be conveniently inserted; and easily adjusted while the machine is operating for properly "framing" the view sections upon the screen thereby to bring them into perfect unity; and wherein the flicker incident to the projection of motion pictures is reduced to a minimum and scarcely discernible.

A further and very important object of the invention is the attainment of a brilliant and steady illumination for each of the view sections by a light of constant value so that there will be a uniformity of illumination throughout the composite picture, and this is realized through the employment of filament electric lamps. The satisfactory use of such lamps for this purpose is made possible by the employment of a unique lens arrangement, shown and claimed in my copending application Serial No. 245,998 filed July 22, 1918; and a special shutter which I have disclosed herein, and this combination of filament lamp, lens arrangement and shutter I regard an important part of my present invention.

Further objects in addition to those above enumerated will become apparent as this description proceeds, and all are attained in the apparatus illustrated in the drawings accompanying and forming a part hereof; and while I shall proceed to describe the apparatus in detail I wish to be understood as not limiting myself to the structural details thereof further than is required by the terms of the annexed claims as interpreted in the light of the prior art.

In the drawings, Figure 1 is a plan view, and Fig. 2 a front elevation of a motion picture projecting apparatus embodying my invention; Fig. 3 is a left hand end elevation of the apparatus; Fig. 4 is a section on the line 4—4 of Fig. 1; Fig. 5 is a sectional detail on the correspondingly numbered line of Fig. 4; Fig. 6 is a partial vertical section through the apparatus adjacent one of the cinematographic units as indicated by the line 6—6 of Fig. 1; Fig. 7 is a somewhat enlarged central vertical section through the forward portion of one of the cinematographic units; Fig. 8 is a transverse vertical section through the unit shown in Fig. 7 the plane of section being indicated by the line 8—8 of Fig. 7; Fig. 9 is a horizontal section on the line 9—9 of Fig. 7, looking upward as indicated by the arrows; Fig. 10 is a section on the line 10—10 of Fig. 2 and discloses a part of the driving gear; and Fig. 11 is a sectional detail, on the line 11—11 of Fig. 4, of one of the Geneva movements.

The several elements of the apparatus are mounted upon a table supported at a proper elevation by a suitable structure. The table is designated 1 and adjacent its forward edge are a series (in the present instance four) of cylindrical pivot blocks 2 that are attached to the table as by means of studs 3 which depend from the blocks through apertures in the table and have washers 4 and nuts 5 applied to their lower ends. Journaled upon each pivot block is a hollow cylindrical boss 8 of a supporting plate 9 so that the plate may be turned freely about the vertical axis of the block; and at its rear end the plate has pivoted to it a keeper 10 having a slot 11 through which a thumb screw 12 is inserted and preferably screwed directly into the table 1. By this arrangement, the supporting plate may be locked in any position to which it is adjusted.

Each supporting plate 9 forms the base, so to speak, of one of the cinematographic mechanism or units. A post 15 rises from each supporting plate 9 just rear of its cylindrical boss 8 and has applied to it a member 16 which projects forwardly and over the respective pivot block 2. This member supports the projecting lens, shutter, and a film guide. As here shown, the member is attached to the post 15 by means of studs extending rearwardly from a vertical portion of the member through apertures in the post, and having retaining nuts 17 applied to their protruding ends.

The projecting lens box 20 is sustained in an adjustable manner within a plate 21 that is mounted upon a forward projection 22 of the member 16; and the upper end of a shutter shaft 23 is journaled within the projection 22 while the lower end of the shaft is similarly mounted within a projection 24 of the member.

To the upper end of the shutter shaft is secured an arm 25 which carries at its free end a vertically disposed shutter 26 that is preferably composed of a thin, light, metallic plate, curved transversely on an arc described from the center of the shutter shaft. Secured to the member 16, as by screws 28, is a plate 29 having a light aperture 30. The front surface of this plate is in a plane substantially coincident with the axis of the corresponding pivot block 2, and its high aperture is also in line with said axis. A gate 31 is supported in front of and parallel to each plate 29 by means of hinge elements 32 that are pivoted, at their lower ends, to the member 16, as indicated at 33, so that the gate may be swung toward and from the plate 29. It is adapted to be held adjacent the plate by a latch 35, and its movement away from the plate, when the latch is released, is limited by a stop 36 which is shown as consisting of a forward and an upward projection of the plate 29, the forwardly projecting portion of the stop passing through a notch 37 in the lower edge of the gate. The film, indicated at 38, is adapted to pass with freedom between the plate 29 and gate 31, but it is held with a proper degree of pressure against the plate 29 by the upper and lower portions of a rectangular frame 39 which pass through horizontal slots in the gate and engage the film, while the frame, in turn, is impelled in a direction to accomplish this result by leaf springs 40 that are secured to the gate and extend over and engage the side members of the frame 39. The gate is, of course, provided with a light opening which registers with the light aperture 30 of the plate, the same being designated 41, and it may be explained that when the shutter shaft 23 is oscillated, the shutter 26 is swung in close proximity to this opening.

Situated upon each supporting plate 9 to the rear of its post 15 is a lamp house 45 which contains a filament electric lamp 46. Current to this lamp is supplied through conductors 47 which have the usual connection with a socket 48 into which the plug of the lamp is inserted.

The front wall of the lamp house carries the condenser lenses 50. These lenses and those in the lens box 20, as well as the respective light apertures 30 and 41 of the plate 29 and gate 31, are in axial alinement and therefore have a common axis which I may term the focal axis of the projecting or cinematographic unit of which they form a part. Reference is again made to my former application above identified for a thorough disclosure of my novel lens arrangement; and it is found by experiment that the benefits therein set forth are materially enhanced by using with said lens arrangement my oscillating shutter as herein illustrated. It appears also that this form of shutter is peculiarly adapted to the light and lens arrangement and is, of itself, more efficient when used in such connection than when used with other forms of light and lens. There is therefore an interdependence between these elements which constitutes the basis of an important combination.

The parts I have thus far described comprise the elements of each of the projecting or cinematographic units, and all are identical with the exception of the elevation of their respective focal axes. As will be observed from Fig. 2, the focal axis of each unit is in a different horizontal plane from those of the others, and the film that is used in the apparatus bears a series of longitudinal picture spaces corresponding in number to the number of units, so that each unit has its individual picture space, corresponding to the film strips that are used with the prevailing type of motion picture machines; and it may be explained that the view sections which go to make up a composite picture are separated or distributed along the film correspondingly as the units are spaced laterally from each other so that the sections of a single composite exposure are separated from each other a considerable distance along the film.

I shall next describe the shutter actuating mechanism, and follow with a description of the mechanism for feeding the film, both of which derive their power from the same source. A box-like structure is situated at each end of the table 1 near its forward edge, the one at the left hand end of the machine (as viewed in Figs. 1 and 2) being designated 52, while the one located at the right hand end is designated 53. A similar structure, designated 54, is positioned about the longitudinal center of the machine.

55 is a shaft which extends longitudinally of the table 1 and is journaled in the structures 52, 53, and 54, the same terminating at one end just inside the structure 53, and at the other beyond the left hand end wall of the structure 52 where it has secured to it a pinion 56. As will be seen upon referring to Fig. 3, pinion 56 meshes with a gear 57, carrying a pinion 58 which, in turn, meshes with a gear 59, and the latter gear is adapted to be connected, by a clutch 60, with a driving pulley 61 that is journaled upon the same shaft 62 with the gear 59, the shaft having bearing in the opposed walls of the structure 52. The pulley 61 may be driven from any suitable source of power by a belt 63. The gear 57 and pinion 58 are carried by a shaft 64 which is journaled in the opposed walls of the structure 52. A fly-wheel 62 is shown as carried by shaft 55.

Attention is called to the fact that the shaft 55 intersects the pivotal axes of the supporting plates 9—that is, it extends through the vertical axes of the pivot blocks 2—and secured to the shaft 55 directly above and coincident with the axis of each of the pivot blocks is an eccentric 65. It will be observed from Fig. 9 that the periphery of each eccentric 65 is spherical, and the eccentric is embraced by an eccentric strap of similar internal contour. The strap is designated 67 and is shown as split for convenient application to the eccentric. An arm 68 extends forwardly from each of the eccentric straps 67 and at its forward end has a connection that is of a ball-and-socket nature with a crank pin 69 that depends from a disk 70 which is secured to the lower end of the corresponding shutter shaft 23, so that as the eccentric rotates it will impart an oscillatory movement to the shutter shaft, the ball-and-socket joint permitting freedom of angular movement between the arm 68 and the crank pin. By reason of the spherical contour of the peripheries of the eccentrics 65, it will be seen that the projecting units may be adjusted angularly without any interference whatever from this source inasmuch as the eccentric straps will adjust themselves about the surfaces of the eccentrics with perfect freedom to compensate for such change in anglar relation. These parts require no attention, therefore, when adjusting the units and the operator need concern himself only with the proper positioning of the projected view sections upon the screen.

Mounted for angular adjustment upon each of the box-like structures 53 and 54 is a circular casing 72 containing an intermittent or "Geneva" movement of common type as will be seen by reference to Fig. 10 where the same is shown in detail. The pin carrying disk 73 of the Geneva movement receives its constant rotation through the shaft 74 whereon it is mounted and which depends through the top wall of the structures and has driving connection with the shaft 55. In the case of the movement supported by the structure 54, the driving connection between shafts 74 and 55 is accomplished through the gears 75 and 76; and in the case of the one supported by structure 53, the shaft 74 has a pinion 78 which meshes with a similar pinion 79 on the shaft 80, the latter shaft being driven through miter gears 81 and 82 from shaft 55. The shafts 74 are situated centrally of the casings 72 and constitute the pivotal supports of said casings, while the shafts 84 of intermittent movement, or those to which the star wheels 85 are secured, rise through the casing forward of their centers of oscillation. From the above description it will be seen that the shafts 84 are intermittently rotated from the continual rotation of the shaft 55.

A film driving shaft 86 is supported in a vertical position above the structure 52 at the left hand end of the machine, the upper end of the shaft being guided within a bracket 87 which rises from the structure 52; and the lower end of the shaft has a gear 88 secured to it which meshes with a pinion 89 that is fixed upon a short vertical shaft sustained within the structure 52. This shaft is driven through miter gears 90 and 91 from shaft 55. Each of the shafts 84 and the shaft 86 is equipped with spaced sprocket wheels 93 for coöperation with the sprocket holes or perforations of the film; and associated with each of these shafts is a shaft 94 having grooved rollers 95 for pressing the film into interlocking engagement with the sprocket wheels. This it will be understood is in accordance with the usual practice. The shaft 94, associated with shaft 86, is supported in a pair of arms 97 that are pivoted upon a post 98, so that shaft 94 with its rollers 95 may be swung away from the sprocket wheels to permit the introduction of a film, the shaft being impelled by a suitable spring (not shown) in a direction to engage the rollers with the sprocket wheels. Inasmuch as this is also common, it is deemed unnecessary of further illustration. The arms 100, which carry the shafts 94 associated with the shafts 84 are, in each instance, fixed to a vertical shaft 101 which tends to be rotated in a direction to engage the rollers 95 with the sprocket wheels 93 by means of a spring 102, shown in Fig. 4. The lower one of each pair of arms 100 is provided with a shoulder 103 that is adapted to be engaged by the nose of a dog 104, secured to a pin 105 that rises centrally of the casing 72 and is journaled at its upper end in a suitable bracket 106. Above the bracket the pin is equipped with a knurled head 107 by means of which it may be turned to move, through the intervention of the dog 104, the arms 100 in a direction to disengage the rollers 95 from the sprocket wheels, the nose of the dog being adapted to interlock with the shoulder 103 of the lower arm and hold the parts in such disengaged position until the nose of the dog is forcibly disengaged from the shoulder by the turning of the knurled head 107 in a reverse direction thereby to permit the parts to assume normal position under the influence of the spring 102.

A bracket 110 projects forwardly and outwardly from each end of the table 1 and is adapted to support at a proper elevation upon a spindle 111, a film reel, the one at the left hand end of the machine representing the feed reel, designated 112, while the one at the opposite end of the machine and designated 113, represents the take up reel. The film 38 is led from reel 112 over a vertical roller 114, sprocket wheels 93 of shaft 86, thence between the plate 29 and gate 31 of the first projecting unit. From here it is carried over an adjustable roller 115 which is used for a purpose presently to be explained, the same being carried by arms 116 that are pivoted to a convenient part of the first projecting unit, as indicated at 117. After being led through the next projecting unit, the film is directed successively through the central intermittent feed, the next projecting unit, over a second adjusting roller 115 (identical with the former adjusting roller of the same designation), through the last projecting unit, and over the sprocket wheels of the intermittent feed situated at the right hand end of the machine. From here the film is passed about another set of sprocket wheels 120, carried by shaft 121 that is journaled at its upper end within a bracket 122 and near its lower end within the top wall of the supporting structure 53 below which it is equipped with a gear 123 that meshes with the pinion 124 secured to the previously mentioned shaft 80 and from which the shaft 121 is thus driven. The shaft 121 also carries a pulley 125 for driving a belt 126 that is engaged over a similar but larger pulley 127 on a spindle 128, carried by the right hand bracket 110 and to which the take up reel 113 is applied, the film passing from the last described feeding mechanism over a guide roller 129 direct to reel 113. The film is held in contact with the sprocket wheels 120 by rollers 130 carried by a shaft supported by arms 131 that are pivoted upon a shaft 132 and spring pressed in a direction to engage the rollers 130 with the pin wheels.

Mention has already been made of the fact that the film feeding shafts 84 are forward of the oscillating axes of the casings 72 which contain the Geneva movements. Consequently any angular adjustment of the casings 72 will impart a slight longitudinal movement of the film. This adjustment is utilized for framing the view sections with the light openings of the projecting units, and the feeding mechanism situated at the longitudinal center of the machine takes care of the two units to the left of it, while the feeding mechanism at the right hand end of the machine takes care of framing the view sections for the other two units. As a convenient means of oscillating the casings 72 I employ a pair of levers 135, 136 that are pivoted to the rear top portion of the structure 52, the former having connection with the central feeding mechanism through a link 137, and the latter with the mechanism located at the right hand end of the machine through link 138. Consequently, as these levers are swung upon their pivots, the motion is transmitted through the links to the casings 72 to likewise swing them it being observed that the links are pivotally connected to the casing adjacent their rear edges. The levers 135 and 136 are pivoted upon a stud or screw 139, and a clamping nut 140 is applied to the protruding end of the same for holding the levers in any adjusted position, the nut having an operating handle 141 through which it may be set down against the lever 135.

While the adjustment of the film by means of the mechanism just described takes care of the framing of the pictures throughout the entire series of units so long as the units are retained in a fixed relation to each other, just as soon as the angular relation between the several units is altered, it becomes necessary to adjust the film between the two adjacent units on each side of the central feeding mechanism for the reason that, although the actual distance between the focal axes (so to speak) of the light apertures of these units is constant it being noted that the focal and pivotal axes of each unit intersect at the point where the film passes through the focal axis, there is a slight change effected in the distance which the film has to travel between the light openings because of the breadth of the plates and gates of each unit. This auxiliary adjustment is taken care of by the rollers 115, and when once they are set for a particular angular adjustment of the projecting units, the framing of the pictures may then be accomplished entirely through the medium of the levers 135 and 136.

As to the function of the oscillatory shutter, it may be explained that, in operation, it swings quickly through the ray of light making two complete obscurations for each exposure, the duration of the obscurations being considerably less of course than the period of illumination, this becoming obvious upon considering the extent of the swing of the shutter from one limit of its movement to the other, it being borne in mind that the time the shutter is beyond the light aperture on each side and during the time that it is reversed at each end of its movement, the light is unobstructed. The transverse movement of the vertical edges of the shutter through the ray of light causes a clean quick cut, so to speak, which is far superior in effect to the gradual obscurations and illuminations resulting from the use of the rotating segmental shutters.

Contrary to prevailing theory and practice, I set my light comparatively close to the film, as shown in Fig. 7; and I construct my condenser lenses 50 so as to focus the rays of light at a point well beyond the film or within the objective lens box 20, as more particularly pointed out in my application above identified. Thus the focal point—or hot point, so to speak—is so far removed from the film as to entirely eliminate the danger of explosion or burning of the film even though the film be left stationary for an indefinite length of time. The elimination of this danger also permits the use of a lamp of unusually high candle power. I obtain, therefore, a much brighter illumination than is ordinarily obtained. Then by placing the shutter in close proximity to the film and operating it in the manner in which I do, it is caused to more effectually obscure and reveal the light and with a clean quick stroke as above explained, resulting, not only in a very distinct picture because of the absence of a diffusion of light which would prevail if the shutter were spaced a material distance from the film, but in a saving of light as well.

Having thus described my invention, what I claim is:—

1. In a motion picture apparatus, the combination of a plurality of cinematographic units pivoted for angular adjustment with respect to each other, the pivotal and focal axes of each unit intersecting, and means for directing a film through the focal axes of the several units substantially at the point of intersection of their respective pivotal axes.

2. In a motion picture apparatus, the combination of a plurality of cinematographic units pivoted for angular adjustment with respect to each other, the pivotal and focal axes of each unit intersecting, and means for directing a film through the focal axes of the several units and for maintaining the film at right angles to the focal axis of each unit substantially at the point of intersection of its respective pivotal axis.

3. In a motion picture apparatus, the combination of a plurality of cinematographic units pivoted for angular adjustment with respect to each other, a film guide plate incorporated in each unit, the film engaging surface whereof is substantially coincident with the pivotal axis of the unit, the plate having a light aperture, and means for maintaining the film in contact with the plate.

4. In a motion picture apparatus, the combination of a plurality of cinematographic units pivoted for angular adjustment with respect to each other, a film guide plate incorporated in each unit the film engaging surface whereof is substantially coincident with the pivotal axis of the unit, and means for maintaining the film in contact with the plate.

5. In a motion picture apparatus, the combination of a plurality of cinematographic units pivoted for angular adjustment with respect to each other, a film guide plate incorporated in each unit the film engaging surface whereof is substantially coincident with the pivotal axis of the unit, the plate having a light aperture, mechanism for feeding a film through successive units, means for shifting the mechanism to frame the images of the film with the light apertures of the units, and further means for adjusting the film between adjacent units to compensate for the relative adjustment between the units.

6. In a motion picture apparatus, the combination of a plurality of cinematographic units mounted for angular adjustment with respect to each other, mechanism for feeding a film through successive units; means for shifting the mcehanism to properly frame the images of the film with the light apertures of the units, and an adjustable film guide between adjacent units to compensate for the relative adjustment between said units.

7. In a motion picture apparatus, the combination of a series of cinematographic units mounted for angular adjustment with respect to each other, a plurality of mechanisms for feeding a film through said units, and means concentrated at a given point for adjusting the mechanisms to properly frame the images of the film with the light apertures of the units.

8. In a motion picture apparatus, the combination of a plurality of cinematographic units pivoted for angular adjustment with respect to each other, so that their focal axes may be caused to converge at a greater or less angle, a shutter reciprocable through the focal axis of each unit, an actuating member situated coincident with the pivotal axis of each unit, operative connections between each actuating member and the shutter of the corresponding unit, and common means for operating the actuating members.

9. In a motion picture apparatus, the combination, of a plurality of cinematographic units pivoted for angular adjustment with respect to each other, a shutter reciprocable transversely through the focal axis of each unit, a shaft intersecting the pivotal axes of the several units, actuating members upon the shaft and situated coincident with the pivotal axis of each unit, and operative connections between each actuating member and the shutter of the corresponding unit.

10. In a motion picture apparatus, the combination of a plurality of cinematographic units pivoted for angular adjustment with respect to each other, a shutter shaft supported at right angles to the focal axis of each unit, a shutter connected to the shaft and adapted to be reciprocated transversely through the focal axis of the unit by the oscillation of the shaft, an actuating member situated coincident with the pivotal axis of each unit, operative connections between each actuating member and the shutter shaft of the corresponding unit, and common means for operating the actuating members.

11. In a motion picture apparatus, the combination of a plurality of cinematographic units mounted for adjustment to vary the angular relation of their focal axes, a reciprocating or oscillating shutter incorporated in each unit, a shaft common to all units, eccentrics fixed to the shaft, one for actuating each shutter, and operative connections between each eccentric and the respective shutter.

12. In a motion picture apparatus, the combination of a plurality of cinematographic units mounted for adjustment to vary the angular relation of their focal axes, a shutter shaft supported at right angles to the focal axis of each unit, a shutter operatively connected thereto and adapted to be reciprocated transversely through the focal axis of the unit when the shaft is oscillated, a crank on the shaft, an eccentric situated coincident with the pivotal axis of each unit, the periphery of each eccentric being of spherical contour, an eccentric strap of complementary shape embracing each eccentric, connections between each eccentric strap and the shutter shaft crank of the corresponding unit, the connections with the crank being of a character permitting universal movement between the parts, and means for actuating the several eccentrics.

13. In a motion picture machine, the combination of a base, pivot members mounted thereon, a cinematographic unit pivoted upon each member, a shaft supported by the base and intersecting the axes of the several pivot members, a shutter reciprocable transversely through the focal axis of each unit, an actuator mounted upon the shaft coincident with the axis of each pivotal member, operative connections between each actuator and the shutter in the corresponding unit, and means for rotating the shaft.

14. In apparatus of the character set forth, the combination of a plurality of cinematographic units pivotally supported for angular adjustment with respect to each other, a shaft intersecting the pivotal axes of the several units, means for directing a film through the focal axes of the several units substantially at points intersected by their respective pivotal axes, a shutter incorporated in each unit reciprocable transversely through the pivotal axis of the unit in close proximity to the film, actuating members mounted upon the shaft, one coincident with the pivotal axis of each unit, and operative connections between each member and the shutter of the corresponding unit.

15. In apparatus of the character set forth, the combination of a plurality of cinematographic units pivoted for angular adjustment with respect to each other, the pivotal and focal axes of each unit intersecting, means for directing a film through the focal axes of the several units substantially at the point of intersection by their respective pivotal axes, a shaft intersecting the pivotal axes of the units, a shutter incorporated in each unit and reciprocable through the focal axis thereof in close proximity to the film, actuating members carried by the shaft, one coincident with the pivotal axis of each unit, operative connections between each of said members and the shutter of the corresponding unit, film feeding mechanism, and operative connections between the shaft and said mechanism.

16. In apparatus of the character set forth, the combination of a base, a plurality of cinematographic units pivotally supported thereon for angular adjustment with respect to each other, slotted plates carried by the units, and clamping devices carried by the base and extending through the slots of the clamping plates and adapted to coöperate with said plates to hold the units in any adjusted position.

17. In apparatus of the character set forth, the combination of a base, cinematographic units pivotally supported by the base for angular adjustment with respect to each other, a plate connected to each unit and extending laterally therefrom and overlying the base, and clamping means carried by the base for coöperation with the plate of each unit for securing the unit in any adjusted position.

18. In apparatus of the character set forth, the combination of a base, cinematographic units pivotally supported by the base for angular adjustment with respect to each other, a slotted plate connected to each unit and extending laterally therefrom and overlying the base, and clamping means carried by the base and extending through the slots of the plates for coöperation therewith to secure the units in any adjusted position.

19. In apparatus of the character set forth, the combination of a base, a plurality of supporting plates pivoted thereto for angular adjustment with respect to each other, the pivotal axes of the plates being in alinement, a shaft intersecting the pivotal axes of the several plates, a member supported by each plate and extending forwardly over the shaft, a lens box supported by the forward end of said member, a film guide sustained by said member substantially in the vertical plane of the shaft, a shutter supported by the member between the lens box and film guide and arranged for reciprocation in close proximity to the guide, actuating members carried by the shaft, one being situated coincident with the pivotal axis of each supporting plate, operative connections between said actuating member and the corresponding shutter, and a source of light supported by each plate in operative relation to the lens box.

20. In apparatus of the character set forth, the combination of a base, a plurality of supporting plates pivotally supported thereby for angular adjustment with respect to each other, the pivotal axes of the plates being in alinement, a shaft intersecting the pivotal axes of the several plates, a member carried by each plate and extending forwardly over the shaft, a lens carried by the forward end of said member, a shutter shaft vertically supported within said member, connection between each shutter shaft and the first mentioned shaft of such nature as to cause said connection to automatically adjust itself to the angular adjustments of the plate, a film guide supported by each member substantially in the vertical plane of the pivotal axis of the corresponding plate, a shutter supporting arm carried by the shutter shaft and extending rearwardly therefrom into close proximity to the film guide, a shutter carried by the free end of said arm, and a source of light carried by each supporting plate in operative relation to the lens sustained thereby.

In testimony whereof, I hereunto affix my signature.

GEORGE W. BINGHAM.